United States Patent
Ghosh et al.

(10) Patent No.: US 8,554,599 B2
(45) Date of Patent: Oct. 8, 2013

(54) WORK ITEM RULES FOR A WORK ITEM TRACKING SYSTEM

(75) Inventors: Amit Dilip Ghosh, Woodinville, WA (US); Mareen A. Philip, Bellevue, WA (US); Tomas Talius, Sammamish, WA (US); Alastair I. Bell, Dundee (GB)

(73) Assignee: Microsoft Corporation, Redmond, WA (US)

( * ) Notice: Subject to any disclaimer, the term of this patent is extended or adjusted under 35 U.S.C. 154(b) by 1424 days.

(21) Appl. No.: 11/090,692

(22) Filed: Mar. 25, 2005

(65) Prior Publication Data

US 2006/0218030 A1    Sep. 28, 2006

(51) Int. Cl.
*G06Q 10/00* (2012.01)
(52) U.S. Cl.
USPC ........ 705/7.27; 705/7.12; 705/7.23; 717/121; 717/122
(58) Field of Classification Search
USPC .............. 705/8, 9, 10, 7.11, 7.13, 7.23, 7.27; 717/121–122
See application file for complete search history.

(56) References Cited

U.S. PATENT DOCUMENTS

| | | | |
|---|---|---|---|
| 4,809,170 A * | 2/1989 | Leblang et al. | 717/122 |
| 5,321,610 A * | 6/1994 | Breslin | 705/7.17 |
| 5,339,435 A * | 8/1994 | Lubkin et al. | 717/121 |
| 5,455,903 A * | 10/1995 | Jolissaint et al. | 715/835 |
| 5,574,898 A * | 11/1996 | Leblang et al. | 1/1 |
| 5,581,691 A * | 12/1996 | Hsu et al. | 714/15 |
| 5,765,140 A * | 6/1998 | Knudson et al. | 705/9 |
| 5,999,911 A * | 12/1999 | Berg et al. | 705/9 |
| 6,006,193 A * | 12/1999 | Gibson et al. | 705/7.26 |
| 6,078,325 A * | 6/2000 | Jolissaint et al. | 715/839 |
| 6,157,934 A | 12/2000 | Khan et al. | |
| 6,212,549 B1 * | 4/2001 | Page et al. | 709/205 |
| 6,308,164 B1 * | 10/2001 | Nummelin et al. | 705/7.23 |
| 6,862,488 B2 * | 3/2005 | Mansour-Awad | 700/97 |
| 6,937,993 B1 * | 8/2005 | Gabbita et al. | 705/8 |
| 7,051,036 B2 * | 5/2006 | Rosnow et al. | 707/723 |

(Continued)

FOREIGN PATENT DOCUMENTS

EP    0 953 929 A3    11/1999
JP    04-367049       12/1992

(Continued)

OTHER PUBLICATIONS

Lisa Kempfer. (Feb. 1999). First to market: The power of managing products. Computer—Aided Engineering, 18(2), 34-40.*

(Continued)

*Primary Examiner* — Gurkanwaljit Singh

(57) ABSTRACT

Work item rules for a work item tracking system are provided. Work item rules may be accessible, usable and subject to interpretation by multiple software entities. Further, work item rules may be configured to be subject to creation and change by users, for example, by exposure to users through a user interface. A work item rule may specify an identifier by which the abstraction can be identified and/or a name, and may specify, or be indicative of, a condition and an action to be taken if the condition is satisfied. In response to a first user action affecting a first work item rule, one or more work item rules corresponding to the first user and/or the first work item may be determined. The one or more work item rules then may be interpreted, and the user action responded to based on the interpretation.

15 Claims, 9 Drawing Sheets

(56) References Cited

U.S. PATENT DOCUMENTS

| | | | |
|---|---|---|---|
| 7,054,823 B1* | 5/2006 | Briegs et al. | 705/2 |
| 7,076,728 B2* | 7/2006 | Davis et al. | 715/205 |
| 7,275,039 B2* | 9/2007 | Setteducati | 705/7.24 |
| 7,313,798 B2* | 12/2007 | Annadata et al. | 719/321 |
| 7,334,213 B2* | 2/2008 | Ohmori et al. | 717/101 |
| 7,937,281 B2* | 5/2011 | Miller et al. | 705/7.11 |
| 2002/0052771 A1 | 5/2002 | Bacon et al. | |
| 2002/0055870 A1* | 5/2002 | Thomas | 705/10 |
| 2002/0120493 A1* | 8/2002 | Mormile | 705/11 |
| 2002/0152244 A1* | 10/2002 | Dean et al. | 707/530 |
| 2003/0018705 A1* | 1/2003 | Chen et al. | 709/202 |
| 2003/0058277 A1* | 3/2003 | Bowman-Amuah | 345/765 |
| 2003/0097273 A1* | 5/2003 | Carpenter et al. | 705/1 |
| 2003/0106039 A1* | 6/2003 | Rosnow et al. | 717/100 |
| 2003/0144969 A1* | 7/2003 | Coyne | 705/400 |
| 2003/0188290 A1* | 10/2003 | Corral | 717/101 |
| 2004/0006403 A1* | 1/2004 | Bognanno | 700/109 |
| 2004/0039623 A1* | 2/2004 | Setteducati | 705/8 |
| 2004/0117294 A1* | 6/2004 | Ferraro et al. | 705/37 |
| 2005/0033619 A1* | 2/2005 | Barnes et al. | 705/7 |
| 2005/0125274 A1* | 6/2005 | Nastacio et al. | 705/8 |
| 2006/0218028 A1* | 9/2006 | Kelly et al. | 705/8 |

FOREIGN PATENT DOCUMENTS

| | | |
|---|---|---|
| JP | 10-013403 | 1/1998 |
| Jp | 2000-137435 | 5/2000 |
| JP | 2002-288405 | 10/2002 |
| JP | 2002537602 A | 11/2002 |
| JP | 2004-110102 | 4/2004 |
| WO | 0049519 A1 | 8/2000 |
| WO | WO 2004102454 A2 | 11/2004 |

OTHER PUBLICATIONS

Mahil Carr, & Christian Wagner. (2002). A Study of Reasoning Processes in Software Maintenance Management. Information Technology and Management, 3(1-2), 181-203.*

King, P. et al., "Default Databases and Incomplete Information", The Computer Journal, vol. 34, No. 3, 1991.

Notice of Rejection mailed Jan. 20, 2012 from corresponding Japanese Patent Application No. 2006-086542.

Notice of Rejection for Japanese Application No. 2006-086542, and English traslation, dated Aug. 10, 2012, 7 pages.

* cited by examiner

```
<WITD application='work item type editor'version='1.0'>

<WORKITEMTYPE name='bug'>

<DESCRIPTION>Bug work item types are used to track defects with the code.
</DESCRIPTION>

<GLOBALLISTS>
</GLOBALLISTS>

<FIELDS>
</FIELDS>

<WORKFLOW>
</WORKFLOW>

<FORM>
</FORM>

</WORKITEMTYPE>

</WITD>
```

FIG. 2

```
<FIELD name="Title">
<READONLY not="[Project]\Testers"/>
</FIELD>
```

FIG. 3

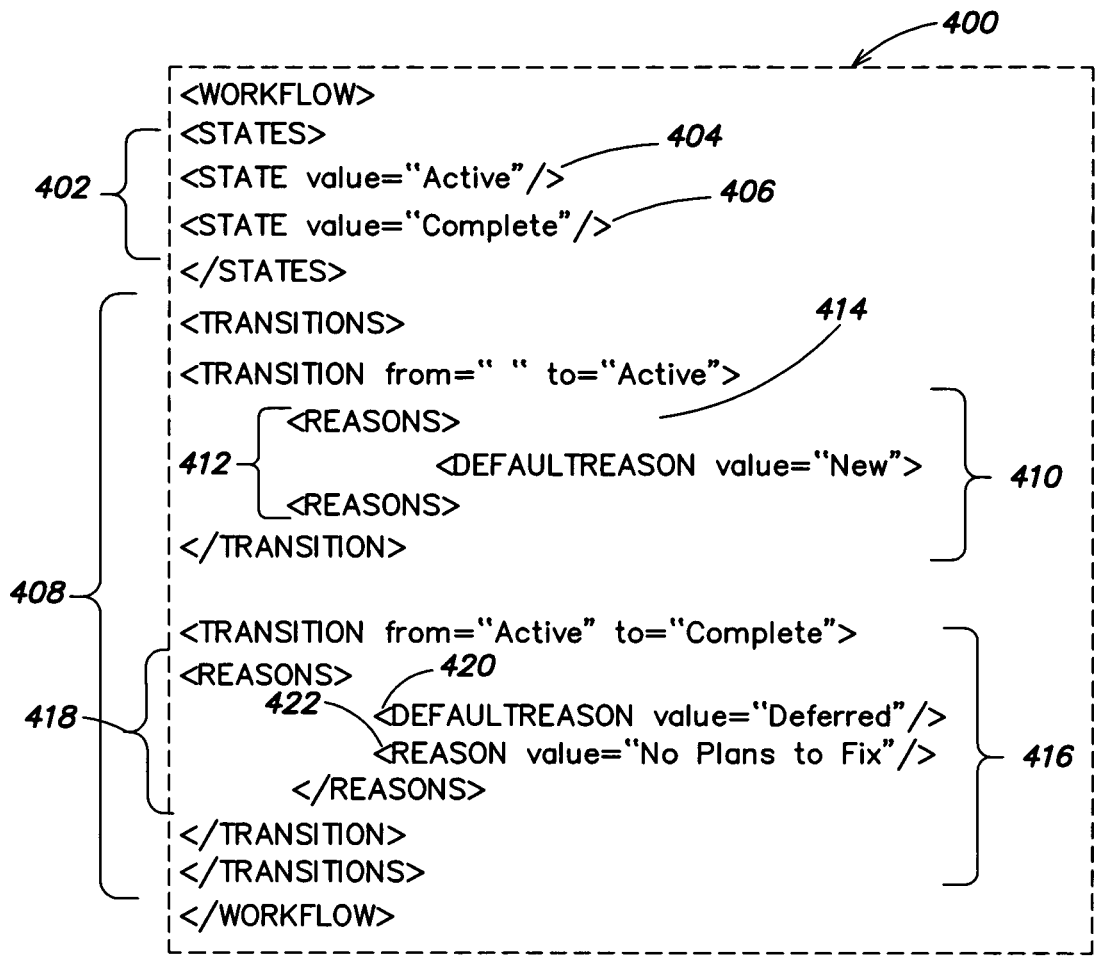

```
                                                    ┌─400
┌─ <WORKFLOW>
│  <STATES>         ┌─404
│  <STATE value="Active"/>
│  <STATE value="Complete"/>─── 406
│  </STATES>
│
│  <TRANSITIONS>              414
│  <TRANSITION from=" " to="Active">
│       <REASONS>
│  412─      <DEFAULTREASON value="New">   ├─ 410
│       <REASONS>
│  </TRANSITION>
│
│  <TRANSITION from="Active" to="Complete">
│  <REASONS>   ┌─420
│  422─ <DEFAULTREASON value="Deferred"/>
│          <REASON value="No Plans to Fix"/>  ├─ 416
│       </REASONS>
│  </TRANSITION>
│  </TRANSITIONS>
└─ </WORKFLOW>
```

FIG. 4

```
                                                    ┌─500
<TRANSITION from="Resolved" to="Complete" for="AllTesters"
not="NewTesters'>
</TRANSITION>
```

FIG. 5

WORK ITEM RULES FOR A WORK ITEM TRACKING SYSTEM

BACKGROUND

Work item tracking systems are often used in today's business world, particularly in software development environments. Work item tracking systems typically enable users to define one or more work items representing units of work, and track the progress of the units of work by updating the work items representing the units of work. A unit of work can be of any of a variety of types, including, but not limited to: a task to be performed by one or more persons; software related work items such as a bug fix (i.e., correction of a software defect) or an improvement/addition to a software application; a project; another type of work item, or any combination of the foregoing. As used herein, a "work item" is a software abstraction (e.g., object, class, record, array, other type of abstraction, or suitable combination of the foregoing) representing and defining a unit of work. A "work item tracking system" or "WITS" is a system that enables the tracking of units of work by enabling manual (by users) and possibly automatic (by the system in response to other events on the system) creation and modification of work items.

Some work item tracking systems are hard-coded to provide different access privileges to different users and/or enable different users to perform different actions on work items. For example, a first software developer (e.g., from a first development team) may be allowed to access and modify a first work item, a second software developer (e.g., from a second development team) may be allowed to access, but not modify (e.g., read-only) the first work item, and a third software developer (e.g., from a third development team) may be denied access to the first work item altogether. These access and modification "rules" are not separately-identifiable, discrete software entities, but rather, their definition and functionality are embedded within the code that controls access to and manipulation of work items (i.e., they are hard-coded). Thus, they are not readily available for use (i.e., re-usable) and subject to alternative interpretation by other entities (i.e., programs and applications).

Further, these rules are closed (not exposed) to users such that they are not subject to creation or change by users. The code must be altered by programmers. Over time, a business's employees, corporate structure, business goals, products and other aspects of the business change. In response to such change, it may be desirable to change the access and modification rules for work items (e.g., add, delete and/or modify one or more rules). However, as described above, this change must be made by a programmer. Thus, an administrator (or other person that desires the change) cannot make the change herself/himself, but must explain the needed modification to a programmer. Further, the administrator can't readily see (except in code form) the actual changes made by the programmer to the code, but can only experience the results of such changes. If the changes do not produce the desired result, the administrator must go back to the programmer and explain the problem, and the process is repeated. This process, requiring interaction between an administrator and programmer for implementing changes to access and/or modification rules, is an inefficient use of business resources.

SUMMARY

Described herein are work item rules for use in a work item tracking system. As used herein, a "work item rule" or "WIR" is an identifiable, discrete software abstraction (e.g., object, class, record, array, other type of abstraction, or suitable combination of the foregoing) defining a rule that regulates, to at least some degree, action that will affect a work item. Work item rules may be accessible, usable and subject to interpretation by multiple software entities. Further, work item rules may be configured to be subject to creation and change by users (i.e., not just programmers), for example, by exposure to users through a user interface (e.g., an XML editor or a GUI). Thus, users may be enabled to create and modify business rules abstractions that control access to, and/or modification of, work items.

A work item rule may specify an identifier by which the abstraction can be identified and/or a name, and may specify, or be indicative of, a condition and an action to be taken if the condition is satisfied. Such a condition may correspond to any of: a user or a group of users; content of a work item (e.g., fields, workflow, transitions, states, etc.); one or more properties (e.g., type or other metadata) of a work item; a business product or aspect thereof, other information relating to work items; or any suitable combination of the foregoing.

In some embodiments, a user interface (e.g., an XML editor or a GUI) is provided that enables authorized users (e.g., an administrator) to create and/or modify work item rules.

Is some embodiments of the invention, a work item tracking system may organize work item rules in a logical hierarchy, for example, in a tree-like arrangement. The organization of the logical hierarchy of work items may correspond to an organizational structure of another entity such as, for example, a business product or a corporate structure. Relationships may be defined between work items within the hierarchy. For example, a work item on a second level of the hierarchy may have a parent relationship with one or more work items on a first level of the hierarchy. As such, a work item rule defined for one of the work items on the first level may be overridden by a work item defined for the work item on the second level. In some embodiments, regardless of position within the logical hierarchy, a work item rule resulting in a negative determination will override another work item rule resulting in a positive determination.

In some embodiments of the invention, in response to a first user action affecting a first work item rule, one or more work item rules corresponding to the first user and/or the first work item may be determined. The one or more work item rules then may be interpreted, and the user action responded to based on the interpretation.

In some embodiments of the invention, work item rules may be enforced in a multi-tier fashion. For example, the work item tracking system may be distributed across multiple tiers, including at least a client work item rule engine and a server work item rule engine. The client work item rule engine may provide a user interface that enables the user to access and/or modify a work item. In response to a user accessing or modifying a work item, the client work item rule engine may interpret one or more corresponding work item rules, after which a server work item rule engine may interpret the same or similar one or more work item rules, possibly in a different fashion (e.g., due to the fact that it may have more current data at its disposal).

As will become clear from the following discussion, work item rules extend the flexibility of known work item tracking systems, because work item rules may be modified relatively easily to adapt to the changing business needs of a business entity, without the assistance of a programmer. Further, the systems and methods for implementing work item rules, described below, enable fine-grained integration of security and maintaining integrity of the contents of work items.

In an embodiment of the invention, user action affecting one or more work items of a work item tracking system is regulated. In response to a first user action affecting a first work item of the work item tracking system, one or more work item rules corresponding to the first user and/or the first work item are determined. The one or more determined work item rules are interpreted, and the first user action is responded to based on the interpretation of the work item rules.

In an aspect of this embodiment, at least one of the one or more determined work item rules corresponds to the first user or a group of users to which the first user belongs, and interpreting includes interpreting the at least one determined work item rule.

In another aspect of this embodiment, at least one of the one or more determined work item rules corresponds to content of a work item, and interpreting includes interpreting the at least one determined work item rule.

In another aspect of this embodiment, at least one of the one or more determined work item rules corresponds to one or more properties of a work item, and interpreting includes interpreting the at least one determined work item rule.

In another aspect of this embodiment, at least one of the one or more determined work item rules corresponds to at least an aspect of a product, and interpreting includes interpreting the at least one determined work item rule.

In yet another aspect of this embodiment, a user interface is provided enabling a user to define one or more work item rules.

In another aspect of this embodiment, the work item tracking system includes a plurality of work items organized in a logical hierarchy, the plurality of work items including the one or more work items. A first work item corresponds to a first level of the hierarchy, and a second work item corresponds to a second level of the hierarchy having precedence over the first level. Determining further includes determining a first work item rule corresponding to the first work item and determining a second work item rule corresponding to the second work item, and interpreting includes interpreting the first and second work item rules and overriding the interpretation of the first work item rule with the interpretation of the second work item rule based, at least in part, on the second level of the hierarchy having precedence over the first level.

In another aspect of this embodiment, the work item tracking system is distributed across at least a first network element and a second network element connected to the first network element by one or more communication media. The first network element includes a first module, and the second network element includes a second module. The first module receives input from a user specifying a user action affecting the first work item. The determining, interpreting and responding are performed by the first module. The second module interprets the one or more determined work item rules.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs. The computer-readable signals may define one or more of the instructions in accordance with a mark-up language.

In another embodiment of the invention, a system is provided for regulating user action affecting one or more work items of a work item tracking system. The system includes a first work item rule engine to determine, in response to a first user action affecting a first work item of the work item tracking system, one or more work item rules corresponding to the first user and/or the first work item, to interpret the one or more determined work item rules, and to respond to the user action based on the interpretation.

In an aspect of this embodiment, at least one of the one or more determined work item rules corresponds to the first user or a group of users to which the first user belongs. The first work item rule engine is operative to interpret the at least one determined work item rule.

In another aspect of this embodiment, at least one of the one or more determined work item rules corresponds to content of a work item, and the first work item rule engine is operative to interpret the at least one determined work item rule.

In another aspect of this embodiment, at least one of the one or more determined work item rules corresponds to one or more properties of a work item, and the first work item rule engine is operative to interpret the at least one determined work item rule.

In yet another aspect of this embodiment, at least one of the one or more determined work item rules corresponds to at least an aspect of a product, and the first work item rule engine is operative to interpret the at least one determined work item rule.

In another aspect of this embodiment, a user interface enabling a user to define one or more work item rules is provided.

In another aspect of this embodiment, the work item tracking system includes a plurality of work items organized in a logical hierarchy, the plurality of work items including the one or more work items. A first work item corresponds to a first level of the hierarchy, and a second work item corresponds to a second level of the hierarchy having precedence over the first level. The first work item rule engine is operative to determine a first work item rule corresponding to the first work item, and determine a second work item rule corresponding to the second work item. The first work item rule engine is operative to interpret the first and second work item rules, and to control an overriding of the interpretation of the first work item rule with the interpretation of the second work item rule based, at least in part, on the second level of the hierarchy having precedence over the first level.

In another aspect of this embodiment, the first work item rule engine resides on a first network element, and the first work item rule engine is operative to receive input from a user specifying the first user action. The system further includes a second work item rule engine residing on a second network element connected to the first network element by one or more communication media, the second work item rule engine operative to interpret the one or more determined work item rules differently than the one or more determined work item rules were applied by the first module.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 2 illustrates an example of a work item type definition, according to some embodiments of the invention;

FIG. 3 illustrates an example of a field section of a work item type definition, according to some embodiments of the invention;

FIG. 4 is an example of a workflow section of a work item type definition, according to some embodiments of the invention;

FIG. 5 is an example of a transition rule, according to some embodiments of the invention;

DETAILED DESCRIPTION

Some embodiments of the invention may be implemented in accordance with the Microsoft Team System technology and/or the Microsoft Team Foundation technology available from Microsoft Corporation, which are described as of the date of filing of this application at: http://lab.msdn.microsoft.com/teamsystem/ and http://blogs.msdn.com/team_foundation/, the entire of contents are hereby incorporated by reference. Further, some embodiments of the invention may be implemented in accordance with the work item tracking system and work item rules technology provided by versions of Microsoft® Visual Studio® (MVS) available from Microsoft Corporation, including Microsoft® Visual Studio® 2005 (MVS 2005), portions of which are described in more detail in Appendices I-III. Appendix I, titled *Design Document; Business Rules Description and Use*, describes an embodiment of business rules and how they may be used. Appendix II, titled *Work Item Type Definition Language*, describes an embodiment of a work item type definition language. Appendix III, titled *Work Item Type Rules—Customer Scenarios*, describes examples of scenarios in which work item type rules may be used. The entire contents of Appendices I-III is hereby incorporated by reference. It should be appreciated that the Microsoft Team System and Team Foundation technologies, MVS technologies and the technologies described in Appendices I-III are merely examples of technologies which may be used to implement embodiments of the invention, and are not intended to limit the scope of the invention. Other technologies, for example, variations of the above technologies, may be used and are intended to fall within the scope of the invention.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
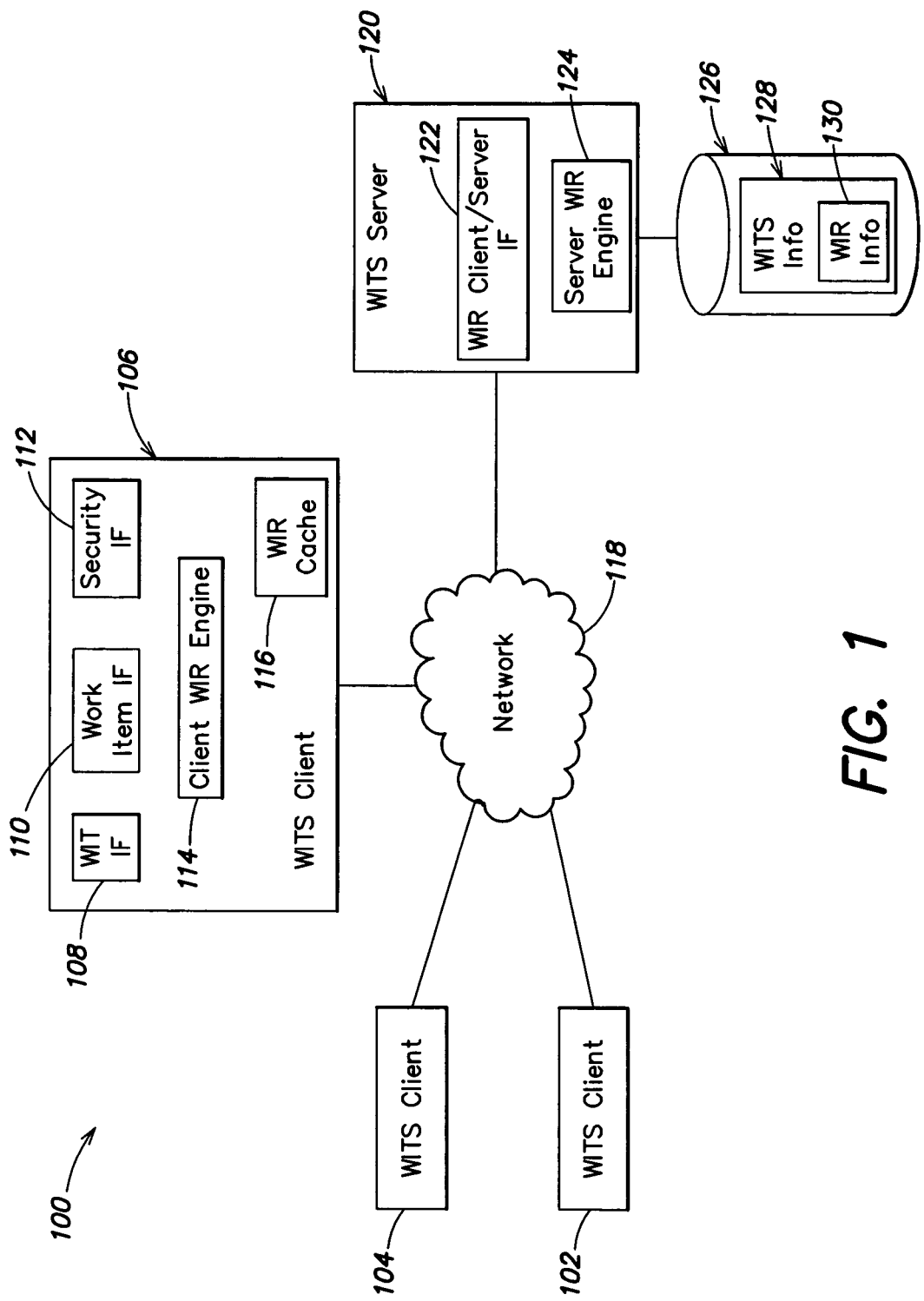
FIG. 1 is a block diagram illustrating an example of a system for implementing work item rules for a work item tracking system, according to some embodiments of the invention.

FIG. 1 is a block diagram illustrating an example of a system 100 for implementing work item rules (WIRs) for a work item tracking system (WITS). System 100 is merely an illustrative embodiment of a system for implementing work item rules for a work item tracking system, and is not intended to limit the scope of the invention. Any of numerous other implementations of such a system, for example, variations of system 100, are possible and are intended to fall within the scope of the invention. For example, some elements illustrated in FIG. 100 that are primarily concerned with WIRs are shown as being more or less integrated within WITS elements. However, WIR elements may in fact be separate and discrete elements from WITS elements.

System 100 may include: one or more WITS clients (e.g., WITS client 102, 104 and 106); one or more WITS servers (e.g., WITS server 120); one or more data sources (e.g., data source 126), each of which may be any of a variety of types data sources such as, for example, a database (e.g., an object-oriented database, a relational database, a file system, another type of database or any combination of the foregoing); network 118, other network elements, or any combination of the foregoing.

As used herein, a "network" is a group of two or more network elements interconnected by one or more segments of transmission media on which communications may be exchanged between the elements. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two network elements connected by a single wire, bus, wireless connection or other type of segments. Further, it should be appreciated that when a network is illustrated in a drawing herein as being connected to an element in the drawing, the connected element itself is considered part of the network.

Each of WITS clients 102, 104 and 106 may be any of a plurality of types of devices such as, for example, user devices. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A WITS client (e.g., WITS client 106) may include any of: work item type interface (WIT IF) 108; work item interface 110; security interface 112; client work item rule (WIR) engine 114 and WIR cache 116.

WIT interface 108 may be a user interface enabling a user to create and/or modify work item type definitions, for example, as described in Appendix II. As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display," respectively.

WIT interface 108 may enable users to manually author XML files or provide a more sophisticated user interface (e.g., a GUI) enabling users to define work item types.

Digressing briefly from FIG. 1, FIG. 2 illustrates an example of a work item type definition 200 in extensible markup language (XML) format. Definition 200 is merely an illustrative embodiment of a work item type definition and is not intended to limit the scope of the invention. Any of numerous other implementations of such a definition, for example, variations of definition 200, are possible and are intended to fall within scope of the invention. For example, although definition 200 is written in XML form, any of a variety of other suitable formats may be used.

Definition 200 may define any of a variety of types of work items such as, for example, a bug, feature, requirement or task, and may include any of: name field 202; description section 206; fields section 210; workflow section 212; form section 214; other sections and fields; or any suitable combination thereof.

Name field 202 may be configured such that the value specified is unique within a team project (described below in more detail). Example names may include: bug, feature, requirement, task, and other names.

Description field 206 may specify help text that can be used at run-time when an overview of the work item type is needed. For example, in FIG. 2, description field 206 specifies "bug work item types are used to track defects within a code."

Form section 214 may specify how relevant fields will be displayed and manipulated by an end user.

Fields section 210 specifies the relevant set of fields for the work item type. In some embodiments, every work item type may contain a set of core fields which are required so that the work item tracking system operates properly. Other fields may be customized for a specific work item type. In some embodiments, every field referenced elsewhere in the work item type definition (e.g. in the form section 214 or the workflow section 212) must first be declared in the fields section 210, with the exception of core required fields. Fields may have the following information: name, reference name, type, help text, and a set of behaviors or constraints. Non-core fields that are explicitly listed may be implicitly empty and read-only for all instances (e.g., work items) of this work item type.

In some embodiments, field rules may be scoped to a specific user or group of users. The attributes "for" and "not" can be added to support this scoping. These attributes may be used on tags to make them specific to a particular group or specific to everyone but a specific group. Such a field rule specifying a "deny" may take precedence over a rule specifying a "grant." (As will be described in more detail below, and as illustrated in Appendix II, a number of rules within a work item type definition may specify one or more users, a group of users, a domain of users, all users, etc.).

FIG. 3 illustrates an example of a fields section 300 of a work item type definition that defines a field rule scoped to a group of users. Field section 300 of FIG. 3 specifies that the field named "title" (302) is a read-only field providing access to everyone except members of [Project]\Testers. If the "not" in field 304 was replaced with a "for", then the rule would specify that the Title field is read-only accessible for the same members, but is not accessible to anyone else.

FIG. 4 is an example of a workflow section 400 of a work item type definition. The workflow section may describe the valid states, legal transitions and legal reasons for the transitions. Reasons may identify why a user is changing from one state to another. In some embodiments, one and only one transition may define a transition from nothing (i.e., " ") to a name state, thereby identifying the initial state for a new work item. Further, every transition may define one and only one default reason within default reason field 420. The smallest workflow for a work item may contain only one state, one transition, and one default reason.

Workflow section 400 may include a state section 402 defining one or more allowable states, 404 and 406, and a transitions section 408 defining one or more permissible transitions for the work item type. Within the transition section 408, one or more transitions may be defined such as, for example, transitions 410 and 416. Transition 410 defines an initial transition from nothing to "active", in which the reasons section 412 includes only a default reason 414 indicating that the default reason is when the value is new. Transition 416 specifies a transition from "Active" to "Complete". Transition 416 includes reasons 420 and 422 within reasons section 418. Reason 420 is the default reason of "deferred", whereas reason 422 specifies a reason of "no plans to fix."

In some embodiments, all legal transitions between two states must be specified, and if no transition is specified, then the default does not allow this transition to be performed. In addition, two attributes "for" and "not" may be optionally used in the transition section of workflow to refine who is allowed to perform a transition. "Denies" may take precedence over "allows". If neither of these attributes are specified, then anyone may be allowed to make this transition (specifically anyone who can modify the work item).

FIG. 5 is an example of a transition rule 500. This transition rule restricts transitions from "resolved" to "complete" for all project testers, except for new testers (e.g., who have just joined the team). A transition rule also may specify individual user identities.

Other examples of work item type definitions, including field sections, fields rules, workflow sections, transitions and transition rules are described in more detail in Appendix II.

Aspects of a work item tracking system may be organized in a logical hierarchy, for example, in a tree-like arrangement. The organization of the logical hierarchy may correspond to an organizational structure of another entity such as, for example, a business product or a corporate structure. The logical hierarchy may include a plurality of levels, the highest level being the root of the hierarchy (e.g., the trunk of the tree). The root of the hierarchy may have one or more child nodes at a next-highest level, and each of these nodes at the next-highest level may have one or more child nodes at a next-highest level, etc.

Figure 6:
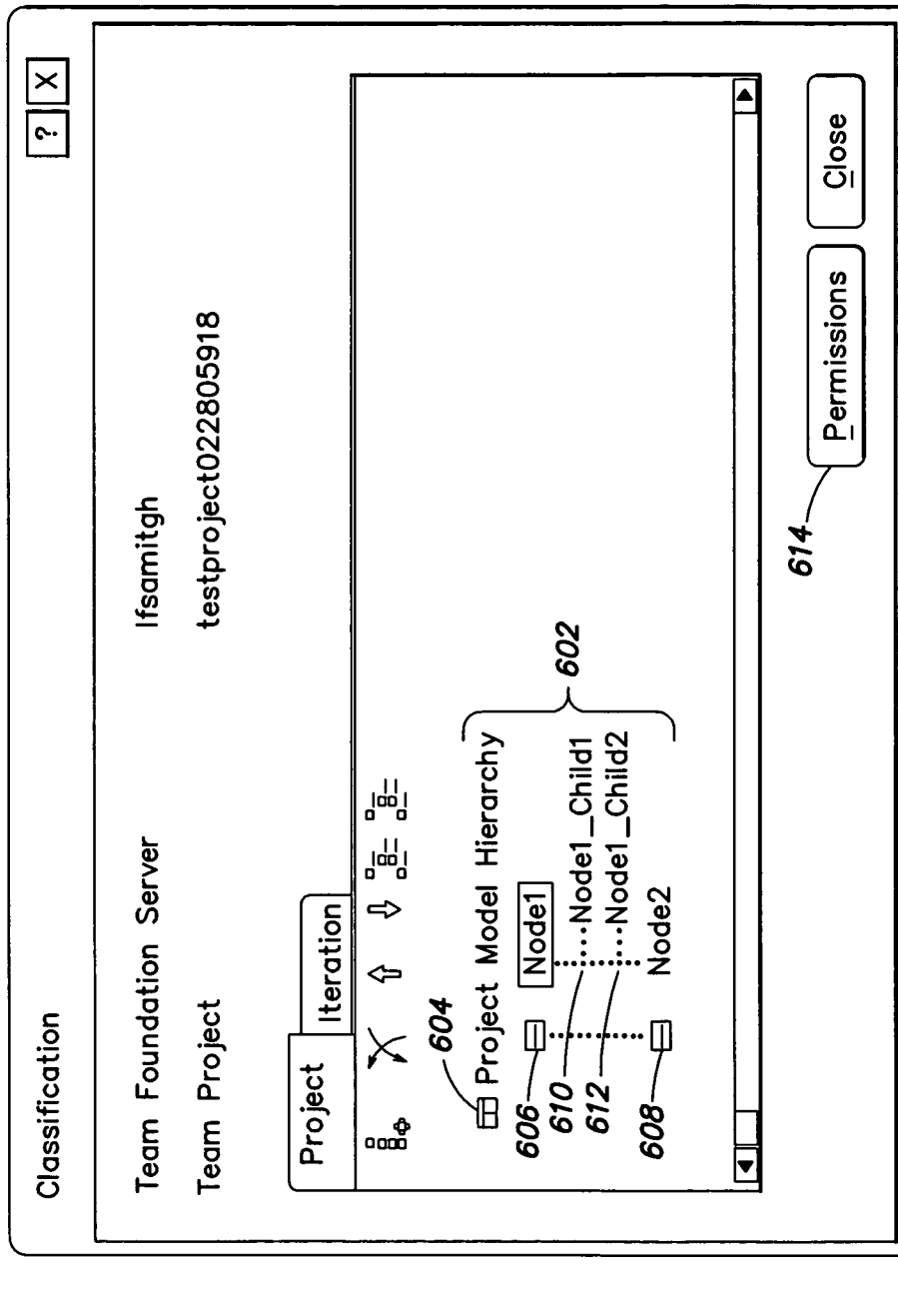
FIG. 6 is a screen shot illustrating an example of a user interface display that may provided to a user to enable a user to select a node of a product tree, according to some embodiments of the invention.

Returning to FIG. 1, the WIT interface 108, which may enable users to enter work item type definitions such as shown in FIGS. 2-5, may be configured such that it enables users to define work item types for a particular node (e.g., the root node, or any of the nodes of lower levels) of a logical hierarchy. Consequently, a work item created (i.e., instantiated) from a particular work item type may have a same scope with respect to the hierarchy as the work item type itself, the scope corresponding to the node for which the type was defined. That is, work item type definitions, and the rules that they include, may be scoped to a particular node of a logical hierarchy of a work item tracking system. FIG. 6, which is described below in more detail, illustrates an example of such a logical hierarchy; specifically, a product tree 602.

Security interface 112 may provide a user interface enabling a user to specify one or more security-based work item rules, and may enable a user to scope such rules to a node in a logical hierarchy (e.g., a product tree) product tree. These rules may be defined independently of any particular work item type. It should be appreciated that WIT interface 108 also allows rules to be defined relating to security, but does so within the scope of a work item type.

FIG. 6 is a screen shot illustrating an example of a user interface display 600 that may be provided to a user to enable a user to select a node of a product tree. In some work item tracking systems, a product tree may have a root node at a first (i.e., highest level), which may correspond to an entire product and/or an MVS "solution". Each node of a second level of the product tree may correspond to a project within the product and/or solution, and each child node of a project node may correspond to a sub-component (e.g., a product feature or other aspect of a product) of its parent project.

Tree portion 602 may represent a project at a second level of a product tree, headed by project node 604, titled "Project Model Hierarchy", having two child nodes 606 ("node 1") and 608 ("node 2"). Node 606 includes two child nodes 610 ("Node 1_Child 1") and node 612 ("Node 1_Child 2"). Display 600 may be configured to enable a user to navigate tree portion 602 (and possibly the rest of the tree) and select one of the nodes, for example, node 606. For defining security-based work item rules, after selecting a node (e.g., node 606) of hierarchy 602, permissions button 614 may be configured to enable the user to indicate the user's intent to define one or more security-based rules. In response to a user selecting permissions button 614, display 700 of FIG. 7 may be displayed.

Figure 7:
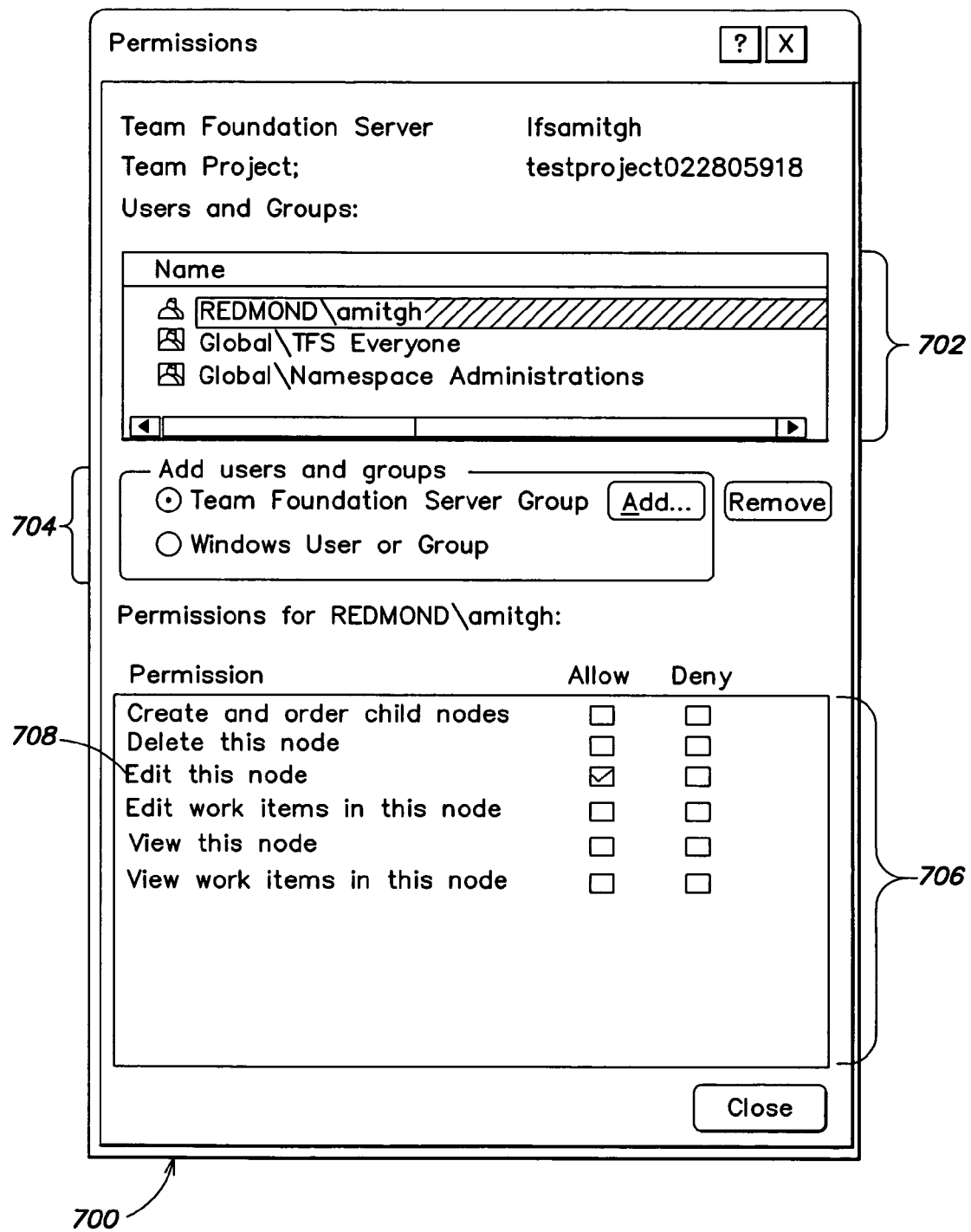
FIG. 7 is a screen shot illustrating an example of a user interface display for enabling a user to specify one or more security-based work item rules, according to some embodiments of the invention.

FIG. 7 is a screen shot illustrating an example of a user interface display 700 for enabling a user to specify one or more security-based work item rules. Display 700 may include any of: users and groups selection window 702; users and groups addition panel 704; permissions window 706; other components; and any suitable combination thereof.

Selection window 702 may enable a user to select a user and/or a group of users for which to define a security-based work item rule. For example, in display 700, user "REDMOND\amitgh" has been selected.

Addition panel 704 may be configured to enable a user to search for and select users and groups of users to add to selection window 702, so that they may be selected for security-based rules. In some embodiments, panel 704 may be enabled to search one or more sources of users and groups such as, for example, Windows users or groups and/or Team Foundation Server groups or users.

Permissions window 706 enables users to specify one or more security-based work item rules for users and groups selected in windows 702. For example, a user may be enabled to specify whether to allow or deny particular actions by a user or group. For example, as illustrated in window 706, a user may be enabled to specify that a user or a group is allowed or denied to (among other things): edit work items in the currently selected node; and/or view work items in the currently selected node. The permissions window 706 also may be configured to enable users to define permissions that are not necessarily related to work item rules such as, for example, allowing the user to edit the selected node (708) itself.

Figure 8:
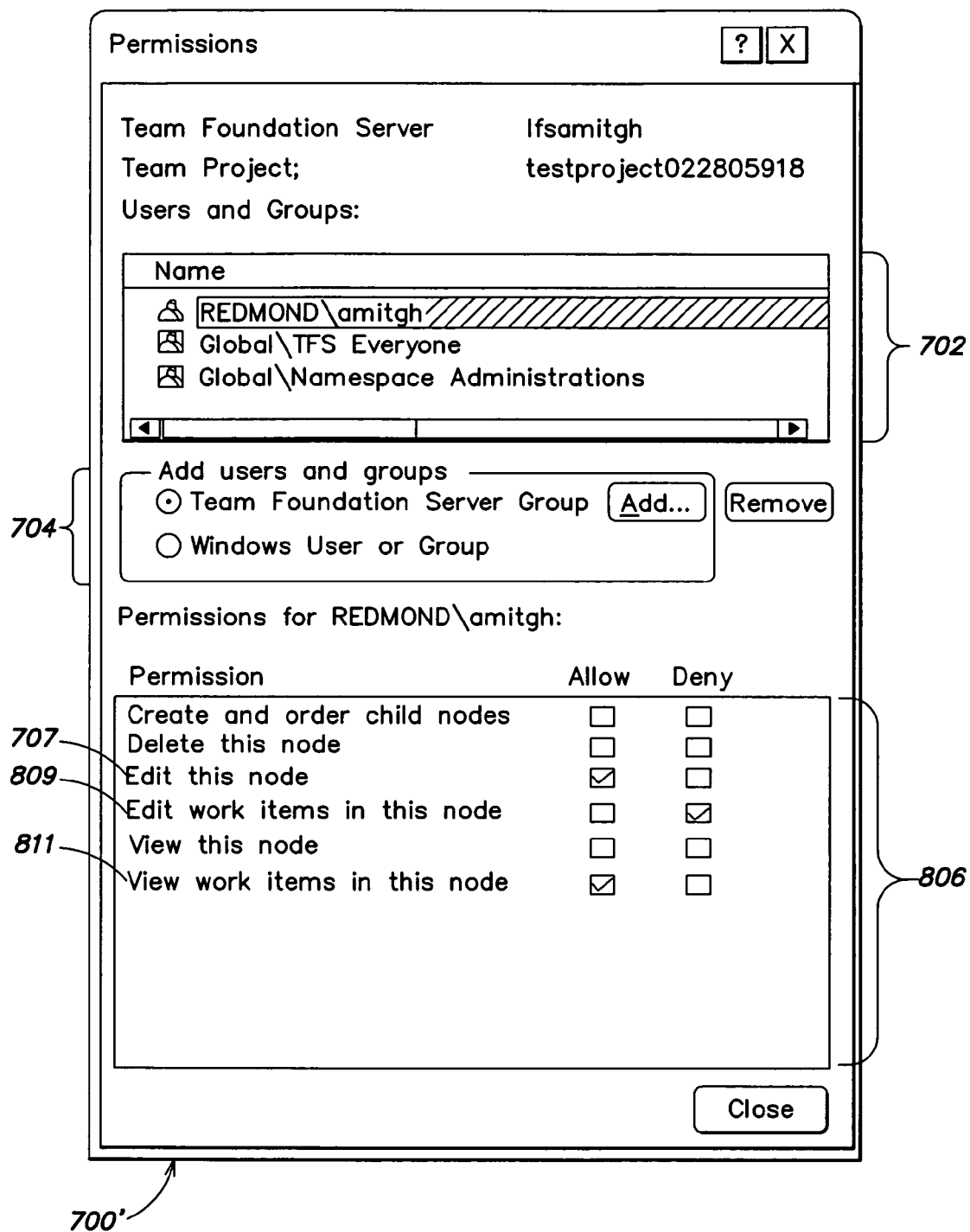
FIG. 8 is a screen shot illustrating an example of a user interface display for enabling a user to specify one or more security-based work item rules, according to some embodiments of the invention.

FIG. 8 is a screen shot illustrating an example of a user interface display 700' for enabling a user to specify one or more security-based work item rules. Display 700' may include any of: users and groups selection window 702; users and groups addition panel 704; permissions window 806; other components; and any suitable combination thereof. Display 700' is identical to display 700, except that the user has specified more permissions in window 806 of display 700'. Specifically, the user has specified that the user selected in windows 702 ("REDMOND\amitgh") is not allowed (i.e., denied) to edit work items in this node (809), but is allowed to view work items in this node (811).

Although display 600 has been described with reference to defining security-based work item rules, independent of work item types, it or a similar display may serve as the entry point for which a user may select a node for which to define one or more work item types. That is, display 600 or a similar display may serve as a navigational tool by which to specify a node of a product tree for which to scope one or more work item type rules.

Thus, as described above, WIT interface 108 may be configured to enable users to define one or more work item rules scoped to specific work item types, which possibly may be scoped to a specific node of a logical hierarchy such as a product tree. Also, security interface 112 may be configured to enable users to define one or more work item rules that are security-based (i.e., specific to a user or a group of users) independent of any particular work item type, which possibly may be scoped to a particular node of a logical hierarchy such as a product tree. Both of these types of rules may be enforced in response to a user action affecting a work item (e.g., accessing and/or modifying a work item). A user may be enabled to undertake a user action affecting a work item by work item interface 110, which will now be described.

Figure 9:
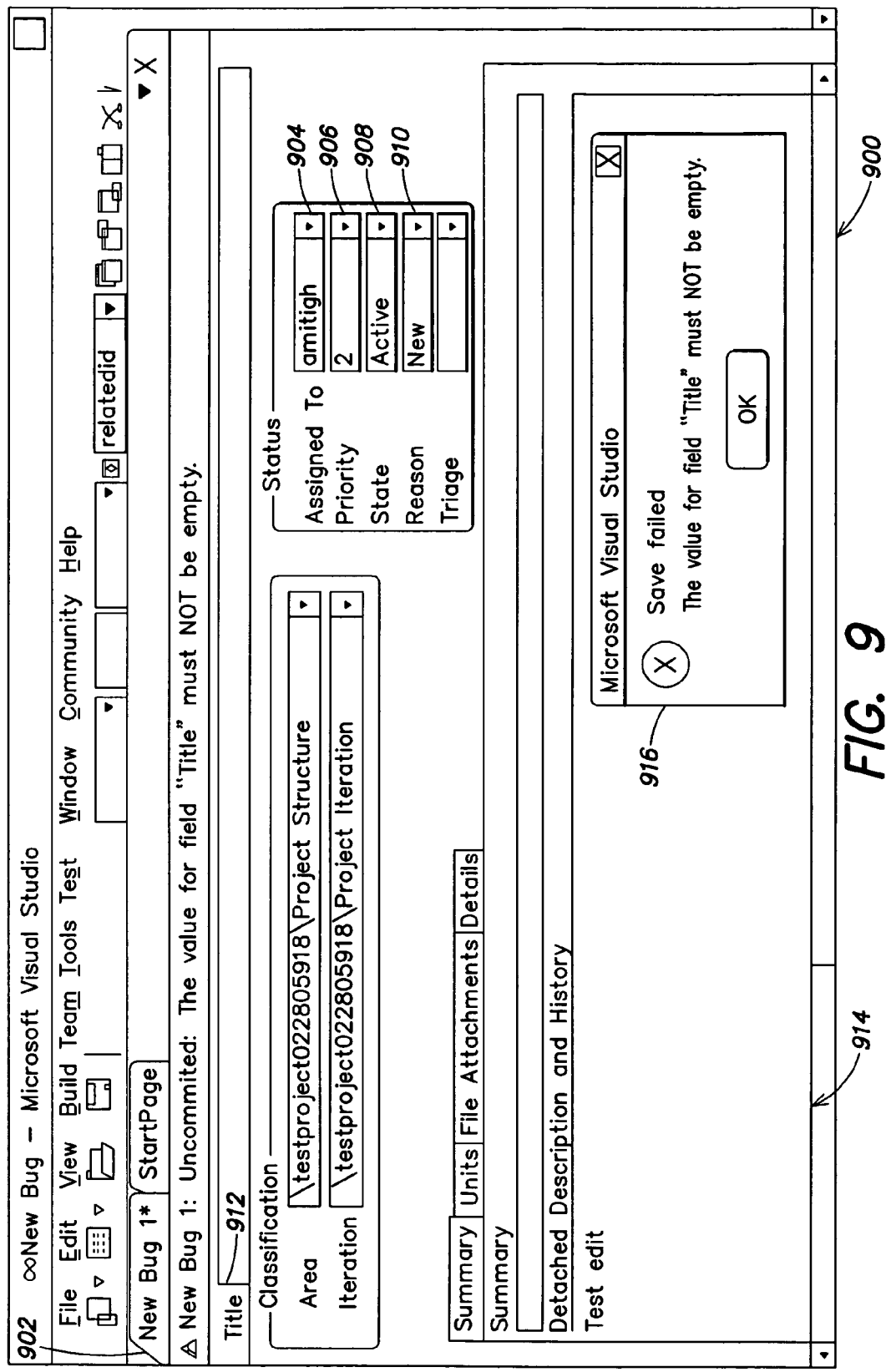
FIG. 9 is a screen shot illustrating an example of a user interfaced display for creating and/or modifying work items, according to some embodiments of the invention.

FIG. 9 is a screen shot illustrating an example of a user interface display 900 for creating and/or modifying work items. Display 900 is merely an example of a user interface display for accessing and/or modifying work item rules, and is not intended to limit the scope of the invention. Any of a variety of other displays such as, for example, variations of display 900, may be used, and are intended to fall with the scope of the invention.

Display 900 may illustrate an example of a work item type of "bug" being created. The work item may have a name "new bug" as illustrated by folder tab 902. Further, the work item may be assigned to user "amitgh", having a priority of "2", in the "active" state because it is "new", as indicated by assignment field 904, priority field 906, state field 908 and reason field 910, respectively. The user may have entered a description of "test edit" in description window 914, and indicated to save the work item. However, because the user did not enter a title in title field 912, an error message (e.g., "Save failed. The value for field 'title' must NOT be emptied empty.") may be displayed to the user in error message window 916. Displaying such an error message in response to a user trying to save the work item "new bug", without entering a value in field 912, may be the result of an enforcement of one or more work item rules, for example, by client WIR engine 114 (as will be described below in more detail). For example, a work item type rule may have specified that a value is required for title Field 912 for user "amitgh", a group to which this user belongs or all users, for example, as described above in relation to FIGS. 2-5.

Returning to FIG. 1, client WIR engine 114 may be configured to enforce work item rules (including work item type rules and/or security-based rules) in response to a user action affecting a work item. For example, engine 114 may be configured to determine the one or more work item rules corresponding to the affected work item, interpret the one or more determined work item rules and respond to the user action based on the interpretation.

Determining one or more work item rules corresponding to the affected work item may include identifying all work item rules corresponding to: the user that is accessing and/or modifying the work item; the node of the logical hierarchy (e.g., product tree) to which the work item corresponds; and the work item type of the work item. These rules may be stored in WIR cache 116, which may cache all of the work item rules associated with system 100. The source of WIR cache 116 may be WIR info 130 of data source 126. Work item rules defined through work item interfaces (e.g., interface 108), security interfaces (e.g., 112), or by other means (e.g., by a system administrator of programmer for required or core rules) on any WITS clients of system 100 may be stored in one or more centralized locations such as data source 126 (e.g., as WIR information 130). These WIR rules may be cached on one or more of such WITS clients.

Interpreting the determined one or more work item rules may include combining the determined rules in some fashion. For example, referring to tree portion 602 of display 600, security-based rules and work item type rules may be defined and thus scoped at various levels of tree portion 602, including at node 604, 606, 608, 610 and/or 612. Client WIR engine 114, using the identification of the user, the node and the work item type as input may evaluate all of the determined rules based on these inputs (and possibly other information) and determine whether the user action is allowed or at least some part of the user action is denied based on this evaluation.

This evaluation or interpretation of rules may be performed in any of a variety of ways. For example, in some embodiments, a rule defined for a given node of a logical hierarchy (e.g., a tree node) takes precedence over a conflicting rule defined for a lower node in the logical hierarchy. In some embodiments, for a plurality of rules applicable to a particular user action, only one rule has to be interpreted as negative (e.g., action denied) for the user action to be denied, regardless of the number of the plurality of rules interpreted as affirmative (e.g., action allowed) or the fact that a rule that was interpreted as affirmative was higher in the logical hierarchy than the rule interpreted as negative.

For example, consider the following scenario with reference to product tree portion 602:

1. User 1 is a member of Group A;
2. A first security-based rule specifies that users of Group A are allowed to edit work items of project node 604;
3. A second security rule specifies that user 1 is not allowed (i.e., denied) to edit work items of node 606;
4. Under node 606 of project node 604, user 1 tries to save a change to a value of a priority field of a first work item of type "bug".

For this scenario, assume the first and second security-based rules are determined by the client WIR engine 114. If the first security rule is given priority over the second security-based rule due to its position in the node tree, then the conflict between the first and second security-based rules would be resolved by the first security rule overriding the second security rule. Accordingly, user 1 will be allowed to change the value of the priority field per the first security rule. Alternatively, if engine 114 is configured such that any deny overrides a grant, regardless of position within the node tree, than the second security-based rule would apply. Accordingly, user 1 would not be allowed to change the priority field because the user is not allowed to edit work items of node 606 per the second security-based rule.

Consider a second scenario, where the second security-based rule does not exist, but a work item type rule specifies that for work items of type "bug" of node 606, users of Group A are not allowed to edit the priority field. If the first security-based rule is given priority due to its position in the product tree, then the same result is achieved as in the first scenario, and user 1 is allowed to edit the priority field. Conversely, if any deny overrides all grants of access, then the work item type rule will dictate that user 1 is not allowed to edit the priority field because user 1 is a member of Group A.

In response to any interpretation of one or more rules as denying a user action, the user action may be denied and a message may be displayed to the user such as, for example, a message similar to the message of message window 916 described above in relation to display 900. Further, the client WIR engine 114 may be configured to assist the user in performing allowed user actions, for example, by displaying helpful messages to the user, providing lists of allowed values for fields, etc.

If the interpretation of the one or more determined rules by engine 114 is that the user action is allowed, engine 114 may communicate this transaction to WIR client/server interface 122. Interface 122 may serve an interface (e.g., coordinate communications) between server WIR engine 124 and one or more client WIR engines at different WITS clients (e.g., WITS clients 102, 104 and 106). Interface 122 may translate the transaction received from client WIR engine 114 into a form suitable for server WIR engine 124, and send the translated transaction to engine 124.

WIR engine 124 may be configured to validate all content writes made against WIR info 130 stored in data source 126, and may perform a second determination and interpretation of the work item rules corresponding to the affected work item. In response to receiving the transaction, engine 124 may determine the one or more work item rules (e.g., security-based rules and/or work item type rules) corresponding to the work item using WIR information 130, which may be stored in a tabular form, each row of one or more tables representing a particular rule. Rules may be stored in other forms as well (e.g., as objects in an object-oriented database).

Engine 124 may be configured to construct a view (e.g., an SQL view) from the determined rules, and interpret the rules based on the constructed view. For example, server WIR 124 may be configured to concatenate a plurality of SQL statements generated from the determined rules, and interpret the one or more determined rules by executing the concatenated SQL statement.

If the server WIR engine 124 determines that a user action is not allowed, it may roll back the transaction, and communicate the denial and rollback to the client WIR engine that initiated the transaction.

Determining and interpreting work item rules at both the client WIR engine 114 and the server WIR engine 124 may provide a sort of redundancy to insure that restricted user actions are not allowed. This may help maintain the integrity of the system, particularly by preventing a user action that would violate a core requirement of the work item tracking system. Further, the WIR info 130 may be more current than the information in WIR caches (e.g., work cache 116) used by the client WIR engines, because work item rule updates may have been received by the WITS server from other WITS clients, that were not yet propagated to the WITS client at which the user action took place. Accordingly, the determination and interpretation performed by server WIR engine 124 may reflect a more current state of system 100 than the determination made by a client WIR engine.

System 100 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of system 100 may reside on a single device (e.g., a computer), or one or more components may reside on separate, discrete devices. Further, each component may be distributed across multiple devices, and one or more of the devices may be interconnected.

Further, on each of the one or more devices that include one or more components of system 100, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. System 100, and components thereof, may be implemented using a computer system such as that described below in relation to FIGS. 11 and 12.

Figure 10:
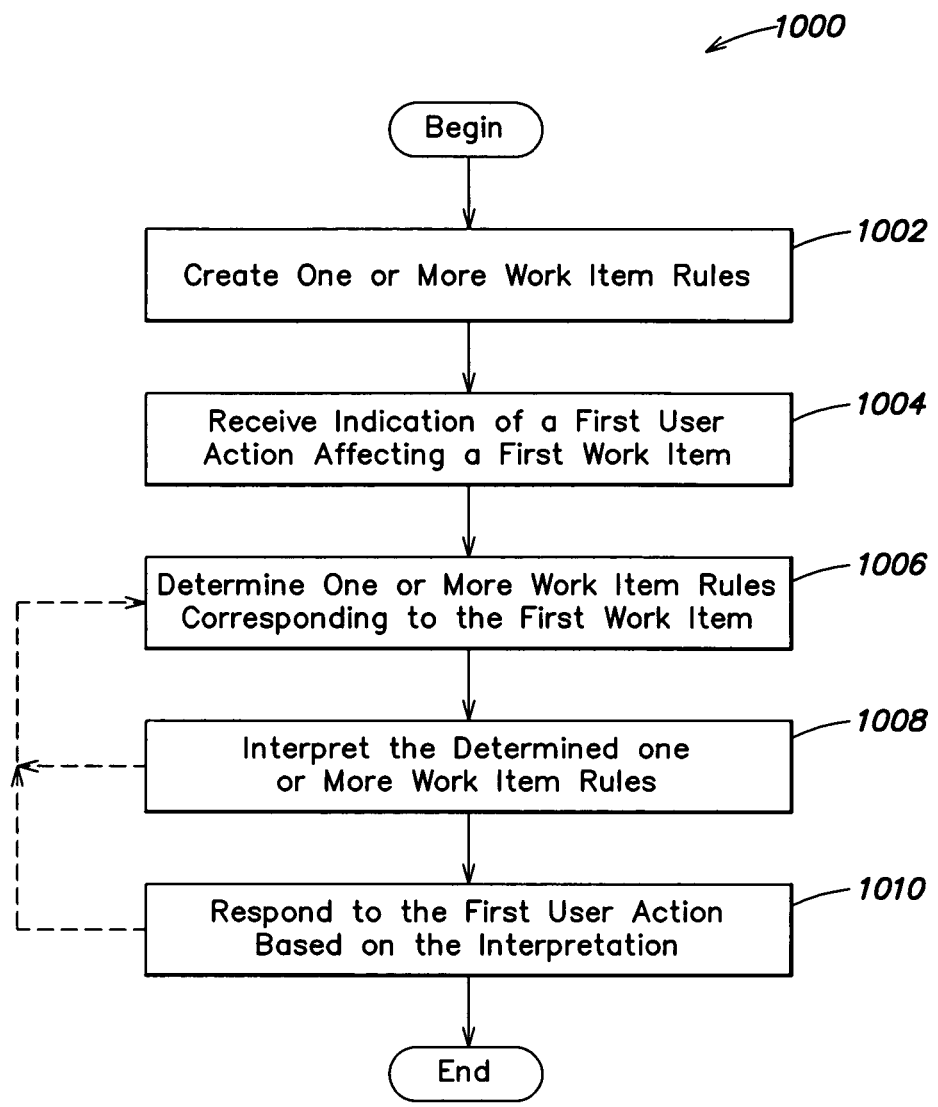
FIG. 10 is a flowchart illustrating an example of a method of implementing work item rules in a work item tracking system, according to some embodiments of the invention.

FIG. 10 is a flow chart illustrating an example of a method 1000 of implementing work item rules in a work item tracking system. Method 1000 is merely an illustrative embodiment of a method of implementing work item rules for a work item tracking system, and is not intended to limit the scope of the invention. Any of numerous other implementations of such a method, for example, variations of method 1000, are possible and are intended to fall within the scope of the invention. Method 1000 and acts thereof may be implemented using system 100 and parts thereof, as described above in relation to FIG. 1.

In Act 1002, one or more work item rules may be created, including one or more security-based rules and/or one or more work item type rules. Act 1002 may be performed by a WIT interface and/or a security interface as described above in relation to system 100 of FIG. 1.

In Act 1004, an indication of a first user action affecting a first work item may be received. For example, a client WIR engine (e.g., engine 114) may receive an indication of a first user action from a work item interface (e.g., interface 110), for example, as described above in relation to FIG. 1.

In Act 1006, one or more work item rules corresponding to the first work item may be determined, and these one or more work item rules may be interpreted in Act 1008. Acts 1006 and 1008 may be performed as described above in relation to system 100. As described in relation to system 100, Acts 1006 and 1008 may be performed by both a client WIR engine (e.g., engine 114) and a server WIR engine (e.g., engine 124). In some embodiments, these acts may be performed slightly differently by these client and server engines. As described above, the server may use data from a more current data source, and may use a different technology (e.g., Microsoft SQL technology) than the client engine in determining and interpreting work item rules. Further, the client WIR engine may assist a user in performing allowed user actions, for example, by listing allowed values and/or actions that the user can perform, as opposed to merely denying the action. In contrast, a server WIR engine's response to an interpretation may be simply to deny the action and/or roll back the transaction encapsulating the user action.

In Act 1010, the first user action may be responded to based on the interpretation. For example, as described above in relation to FIG. 1, a user action may be: denied because it was interpreted as denied by a client WIR engine; denied because it was interpreted as allowed by the client WIR engine, but interpreted as denied by the server WIR engine; or allowed because it was interpreted as allowed by the client and server WIR engines.

Method 1000 may include additional acts. Further, the order of the acts performed as part of method 1000 is not limited to the order illustrated in FIG. 10, as the acts may be performed in other orders and/or one or more of the acts may be performed in series or in parallel, at least partially.

Method 1000 acts thereof and various embodiments and variations of this method and these acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 1000 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 1100 and 1200 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Figure 11:
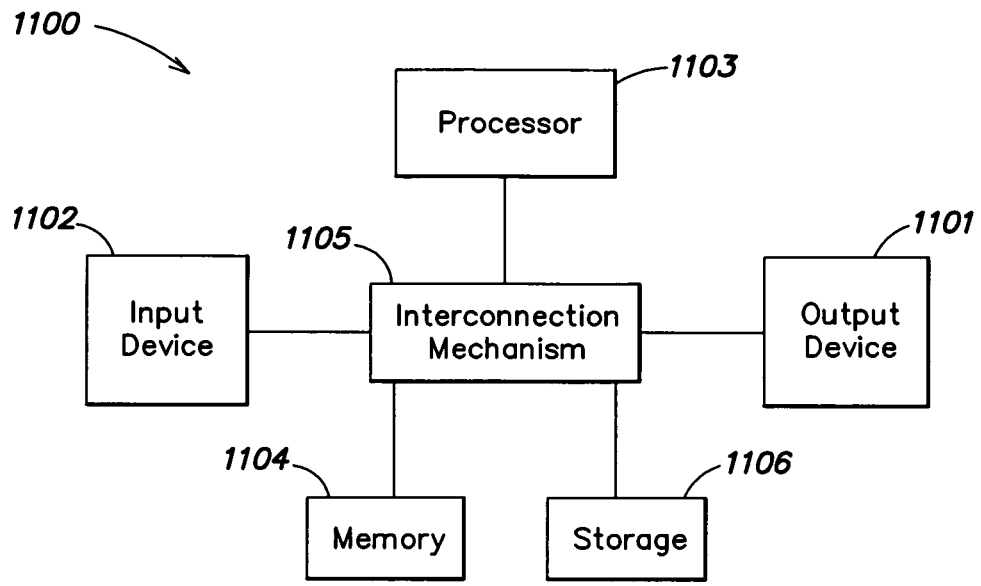
FIG. 11 is a block diagram illustrating an example of a computer system on which some embodiments of the invention may be implemented.
Figure 12:
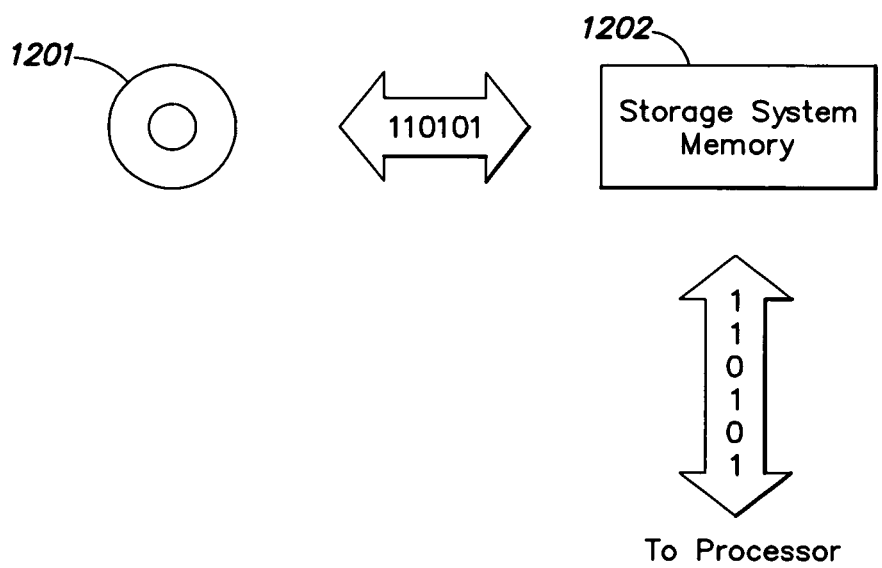
FIG. 12 is a block diagram illustrating an example of a storage system that may be used as part of the computer system to implement some embodiments of the invention.

It should be appreciated that any single component or collection of multiple components of a computer system, for example, the computer system described in relation to FIGS. 1, 11 and 12, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

For example, various aspects of the invention may be implemented as specialized software executing in a general-purpose computer system 1100 such as that shown in FIG. 11. The computer system 1100 may include a processor 1103 connected to one or more memory devices 1104, such as a disk drive, memory, or other device for storing data. Memory 1104 is typically used for storing programs and data during operation of the computer system 1100. Components of computer system 1100 may be coupled by an interconnection mechanism 1105, which may include one or more busses (e.g., between components that are integrated within a same machine) and/or a network (e.g., between components that reside on separate discrete machines). The interconnection mechanism 1105 enables communications (e.g., data, instructions) to be exchanged between system components of system 1100. Computer system 1100 also includes one or more input devices 1102, for example, a keyboard, mouse, trackball, microphone, touch screen, and one or more output devices 1101, for example, a printing device, display screen, speaker. In addition, computer system 1100 may contain one or more interfaces (not shown) that connect computer system 1100 to a communication network (in addition or as an alternative to the interconnection mechanism 1105.

The storage system 1206, shown in greater detail in FIG. 12, typically includes a computer readable and writeable nonvolatile recording medium 1201 in which signals are stored that define a program to be executed by the processor or information stored on or in the medium 1201 to be processed by the program. The medium may, for example, be a disk or flash memory. Typically, in operation, the processor causes data to be read from the nonvolatile recording medium 1201 into another memory 1202 that allows for faster access to the information by the processor than does the medium 1201. This memory 1202 is typically a volatile, random access memory such as a dynamic random access memory (DRAM) or static memory (SRAM). It may be located in storage system 1206, as shown, or in memory system 1204, not shown. The processor 1203 generally manipulates the data within the integrated circuit memory 1204, 1602 and then copies the data to the medium 1201 after processing is completed. A variety of mechanisms are known for managing data movement between the medium 1201 and the integrated circuit memory element 1204, 1202, and the invention is not limited thereto. The invention is not limited to a particular memory system 1204 or storage system 1206.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the invention may be practiced, it should be appreciated that aspects of the invention are not limited to being implemented on the computer system as shown in FIG. 11. Various aspects of the invention may be practiced on one or more computers having a different architecture or components that that shown in FIG. 11.

Computer system 1200 may be a general-purpose computer system that is programmable using a high-level computer programming language. Computer system 1200 also may be implemented using specially-programmed, special-purpose hardware. In computer system 1200, processor 1203 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer-implemented method of regulating user action affecting one or more work items of a work item tracking system for a software development environment, the method comprising acts of:

providing a software development environment including software development work item rules that regulate user action affecting work items during software development using the software development environment, each work item comprising a software element that can be accessed or modified by a user based on one or more of the software development work item rules, the software element being an element under development in the software development environment, the software development work item rules selectively authorizing user access and modification of specified work items;

in response to a first user action affecting a first work item of the work item tracking system, determining, in a client computing device, one or more software development work item rules corresponding to the first work item;

interpreting, in the client computing device, the one or more determined software development work item rules; and responding, in the client computing device, to the first user action by authorizing user access or modification of the first work item based on the interpretation of the one or more determined software development work item rules, wherein the work item tracking system is distributed across at least a first network element and a second network element connected to the first network element by one or more communication media, the first network element comprising a first module, and the second network element comprising a second module, the method further comprising an act of:

the first module receiving input from a user specifying a user action affecting the first work item, wherein the acts of determining, interpreting and responding are performed by the first module, and wherein the method further comprises:

the second module interpreting the one or more determined work item rules.

2. The method of claim 1, wherein at least one of the one or more determined work item rules corresponds to the first user or a group of users to which the first user belongs, and wherein interpreting comprises interpreting the at least one determined work item rule.

3. The method of claim 1, wherein at least one of the one or more determined work item rules corresponds to content of a work item, and
    wherein the interpreting comprises interpreting the at least one determined work item rule.

4. The method of claim 1, wherein at least one of the one or more determined work item rules corresponds to at least an aspect of a product, and
    wherein interpreting comprises interpreting the at least one determined work item rule.

5. The method of claim 1, further comprising:
    providing a user interface enabling a user to define one or more work item rules.

6. The method of claim 1, wherein the work item tracking system comprises a plurality of work items organized in a logical hierarchy, the plurality of work items including the one or more work items,
    wherein a first work item corresponds to a first level of the hierarchy, and a second work item corresponds to a second level of the hierarchy having precedence over the first level,
    wherein determining further comprises determining a first work item rule corresponding to the first work item, and determining a second work item rule corresponding to the second work item, and
    wherein interpreting comprises interpreting the first and second work item rules, and overriding the interpretation of the first work item rule with the interpretation of the second work item rule based, at least in part, on the second level of the hierarchy having precedence over the first level.

7. A system for regulating user action affecting one or more work items of a work item tracking system for a software development environment, the system comprising:
    a computing device comprising a processor and a memory, the memory containing a software development environment including a first work item rule engine that, when executed by the processor, is configured to provide software development work item rules that regulate user action affecting work items during software development using the software development environment, each work item comprising a software element that can be accessed or modified by a user based on one or more of the software development work item rules, the software element being an element under development in the software development environment, the software development work item rules selectively authorizing user access and modification of specified work items, to determine, in response to a first user action, by a first user, affecting a first work item of the work item tracking system, one or more software development work item rules corresponding to the first work item, to interpret the one or more determined software development work item rules, and to respond to the first user action by authorizing user access or modification of the first work item based on the interpretation,
    wherein the work item tracking system comprises a plurality of work items organized in a logical hierarchy, the plurality of work items including the one or more work items,
    wherein a first work item corresponds to a first level of the hierarchy, and a second work item corresponds to a second level of the hierarchy having precedence over the first level,
    wherein the first work item rule engine is operative to determine a first software development work item rule corresponding to the first work item, and determine a second software development work item rule corresponding to the second work item, and
    wherein the first work item rule engine is operative to interpret the first and second software development work item rules, and to control an overriding of the interpretation of the first software development work item rule with the interpretation of the second software development work item rule based, at least in part, on the second level of the hierarchy having precedence over the first level, wherein the first work item rule engine resides on a first network element, and the first work item rule engine is operative to receive input from a user specifying the first user action, the system further comprising:
    a second work item rule engine residing on a second network element connected to the first network element by one or more communication media, the second work item rule engine operative to interpret the one or more determined work item rules differently than the one or more determined work item rules were applied by the first module.

8. The system of claim 7, wherein at least one of the one or more determined work item rules corresponds to the first user or a group of users to which the first user belongs,
    wherein the first work item rule engine is operative to interpret the at least one determined work item rule.

9. The system of claim 7, wherein at least one of the one or more determined work item rules corresponds to content of a work item,
    wherein the first work item rule engine is operative to interpret the at least one determined work item rule.

10. The system of claim 7, wherein at least one of the one or more determined work item rules corresponds to at least an aspect of a product, and
    wherein the first work item rule engine is operative to interpret the at least one determined work item rule.

11. The system of claim 7, further comprising: a user interface enabling a user to define one or more work item rules.

12. A computer-readable storage medium containing computer-executable instructions that, as a result of being executed by a computer, control the computer to perform a process of regulating user action affecting one or more work items of a work item tracking system for a software development environment, the process comprising acts of:
    providing a software development environment including software development work item rules that regulate user action affecting work items during software development using the software development environment, each work item comprising a software element that can be accessed or modified by a user based on one or more of the software development work item rules, the software element being an element under development in the software development environment, the software development work item rules selectively authorizing user access and modification of specified work items;
    in response to a first user action, by a first user, affecting a first work item of the work item tracking system, determining, in a client computing device, one or more software development work item rules corresponding to the first work item;
    interpreting, in the client computing device, the one or more determined software development work item rules;
    responding, in the client computing device, to the first user action by authorizing user access or modification of the first work item based on the interpretation of the one or more determined software development work item rules;

receiving from a user a modification to at least one software development work item rule of the work item rules;

modifying the at least one software development work item rule according to the user modification; and responding to the first user action based on the modified software development work item rule, wherein the work item tracking system is distributed across at least a first network element and a second network element connected to the first network element by one or more communication media, the first network element comprising a first module, and the second network element comprising a second module, the process further comprising an act of:

the first module receiving input from a user specifying a user action affecting the first work item, wherein the acts of determining, interpreting and responding are performed by the first module, and wherein the process further comprises:

the second module interpreting the one or more determined work item rules.

13. The computer-readable storage medium of claim 12, wherein the process further comprises:

providing a user interface enabling a user to define one or more work item rules.

14. The computer-readable storage medium of claim 12, wherein the work item tracking system comprises a plurality of work items organized in a logical hierarchy, the plurality of work items including the one or more work items, wherein a first work item corresponds to a first level of the hierarchy, and a second work item corresponds to a second level of the hierarchy having precedence over the first level, wherein determining further comprises determining a first work item rule corresponding to the first work item, and determining a second work item rule corresponding to the second work item, and wherein interpreting comprises interpreting the first and second work item rules, and overriding the interpretation of the first work item rule with the interpretation of the second work item rule based, at least in part, on the second level of the hierarchy having precedence over the first level.

15. The method of claim 1, further comprising:

receiving from a user a modification to at least one work item rule of the work item rules; modifying the at least one work item rule according to the user modification; and responding to the first user action based on the modified work item rule.

* * * * *